(12) United States Patent
Mirkes et al.

(10) Patent No.: US 11,972,288 B2
(45) Date of Patent: Apr. 30, 2024

(54) APPARATUS, SYSTEM, AND METHOD FOR MULTI-LEVEL INSTRUCTION SCHEDULING IN A MICROPROCESSOR

(71) Applicant: Ampere Computing LLC, Santa Clara, CA (US)

(72) Inventors: Sean Philip Mirkes, Santa Clara, CA (US); John Gregory Favor, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 474 days.

(21) Appl. No.: 17/139,356

(22) Filed: Dec. 31, 2020

(65) Prior Publication Data

US 2022/0206845 A1 Jun. 30, 2022

(51) Int. Cl.
*G06F 9/48* (2006.01)
*G06F 9/38* (2018.01)

(52) U.S. Cl.
CPC .......... *G06F 9/4881* (2013.01); *G06F 9/3802* (2013.01)

(58) Field of Classification Search
CPC ............................ G06F 9/4881; G06F 9/3802
See application file for complete search history.

(56) References Cited

U.S. PATENT DOCUMENTS 9,740,495 B2 * 8/2017 Guo ...................... G06F 9/3836
11,422,821 B1 * 8/2022 Hardage, Jr. ......... G06F 9/3861

* cited by examiner

*Primary Examiner* — Wissam Rashid
(74) *Attorney, Agent, or Firm* — Withrow & Terranova, PLLC (57) ABSTRACT

Aspects disclosed in the detailed description include multi-level instruction scheduling in a processor. Related methods and systems are also disclosed. In one exemplary aspect, an apparatus is provided that comprises a scheduler circuit comprising a scheduling group circuit, a first selection circuit, and a second selection circuit. The scheduling group circuit comprising a plurality of groups of scheduling entries, each scheduling entry among the groups of scheduling entries each comprising an instruction portion and a ready portion, each group configured to have its scheduling entries written in-order. The scheduling group circuit is further configured to maintain group age information associated with each group of the plurality of groups. The first selection circuit is configured to select a first in-order ready entry from each group. The second selection circuit is configured to select the first in-order ready entry belonging to the oldest group based on the group age information for scheduling.

17 Claims, 5 Drawing Sheets

APPARATUS, SYSTEM, AND METHOD FOR MULTI-LEVEL INSTRUCTION SCHEDULING IN A MICROPROCESSOR

BACKGROUND

I. Field of the Disclosure

The technology of the disclosure relates generally to scheduling instructions in a microprocessor, and specifically to a two-dimensional approach to selecting instructions to be scheduled for execution.

II. Background

As part of executing instructions, microprocessors may conventionally perform instruction scheduling. This means selecting specific instructions for execution in one or more execution pipelines of the microprocessor. One conventional approach to instruction scheduling is in-order scheduling, in which instructions are fetched, scheduled, and executed in the order in which they were generated by the compiler. An in-order scheduling approach may be relatively less complex from a hardware perspective, because the microprocessor need not decide which instruction should be executed next. However, an in-order scheduling approach may compromise the performance of the microprocessor, because if a next instruction to be executed stalls (e.g., because of structural or data hazards or dependencies), the entire instruction stream must be stalled until that next instruction is ready to execute.

Another conventional approach to instruction scheduling is out-of-order scheduling. In out-of-order instruction scheduling, a microprocessor may fetch instructions in the order in which they were generated by a compiler, but may select a next instruction to be executed out-of-order from a group of instructions which have been fetched in-order based on a variety of factors (e.g., age of instructions in the fetch group, whether an instruction has unresolved dependencies or hazards, etc.). An out-of-order instruction scheduling approach may be relatively more complex from a hardware perspective, because performing the evaluation on the group of fetched instructions involves comparisons that the in-order scheduler need not perform. However, an out-of-order instruction scheduling approach may provide relatively better performance of the microprocessor, as it can avoid stalling when a next-fetched instruction is not ready for execution, but one or more "newer" instructions are ready for execution and could be scheduled while awaiting resolution of dependencies or hazards for the next-fetched instruction.

Where instructions may be scheduled out-of-order, it is desirable to have the largest-possible group of instructions from which to select a next instruction (sometimes referred to as "scheduler depth"), as the larger the group of possible next instructions is, the less likely that none of them will be ready, and thus the likelihood that the microprocessor will stall is relatively less. Furthermore, increasing the size of the "window" of out-of-order instructions which may be scheduled may reduce the total time for a particular program to complete. However, as scheduler depth grows larger, the time associated with performing all the comparisons in order to select an instruction grows accordingly, and if it grows too large, may compromise the performance advantage of out-of-order scheduling. Thus, it would be advantageous to develop an out-of-order scheduler that allows for a relatively large scheduler depth while mitigating the associated performance penalty.

SUMMARY OF THE DISCLOSURE

Aspects disclosed in the detailed description include multi-level instruction scheduling in a processor. Related methods and systems are also disclosed.

In this regard, in one exemplary aspect, an apparatus is provided that comprises a scheduler circuit comprising a scheduling group circuit, a first selection circuit, and a second selection circuit. The scheduling group circuit comprising a plurality of groups of scheduling entries, each scheduling entry among the groups of scheduling entries each comprising an instruction portion and a ready portion, each group configured to have its scheduling entries written in-order. The scheduling group circuit is further configured to maintain group age information associated with each group of the plurality of groups. The first selection circuit is configured to select a first in-order ready entry from each group. The second selection circuit is configured to select the first in-order ready entry belonging to the oldest group based on the group age information for scheduling.

In another exemplary aspect, an apparatus is provided that includes a means for scheduling comprising means for storing scheduling groups, means for performing a first selection, and means for performing a second selection. The means for storing scheduling groups comprises a plurality of groups of scheduling entries, each scheduling entry among the groups of scheduling entries each comprising an instruction portion and a ready portion, each group configured to have its scheduling entries written in-order. The means for performing a first selection comprises a means for selecting a first in-order ready entry from each group. The means for performing a second selection comprises a means for selecting the first in-order ready entry belonging to the oldest group based on the group age information for scheduling.

In yet another exemplary aspect, a method is provided that includes writing a first plurality of scheduling entries into a first scheduling group in order. The method also includes writing a second plurality of scheduling entries into a second scheduling group in order. The method also includes performing a first selection by choosing a first ready entry in order in each scheduling group. The method also includes performing a second selection by choosing the ready entry from the oldest group as the entry to be scheduled.

In yet another exemplary aspect, a non-transitory computer-readable medium stores computer executable instructions which, when executed by a processor, cause the processor to write a first plurality of scheduling entries into a first scheduling group in order, write a second plurality of scheduling entries into a second scheduling group in order, perform a first selection by choosing a first ready entry in order in each scheduling group, and perform a second selection by choosing the ready entry from the oldest group as the entry to be scheduled.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include multi-level instruction scheduling in a processor. Related methods and systems are also disclosed.

Figure 1:
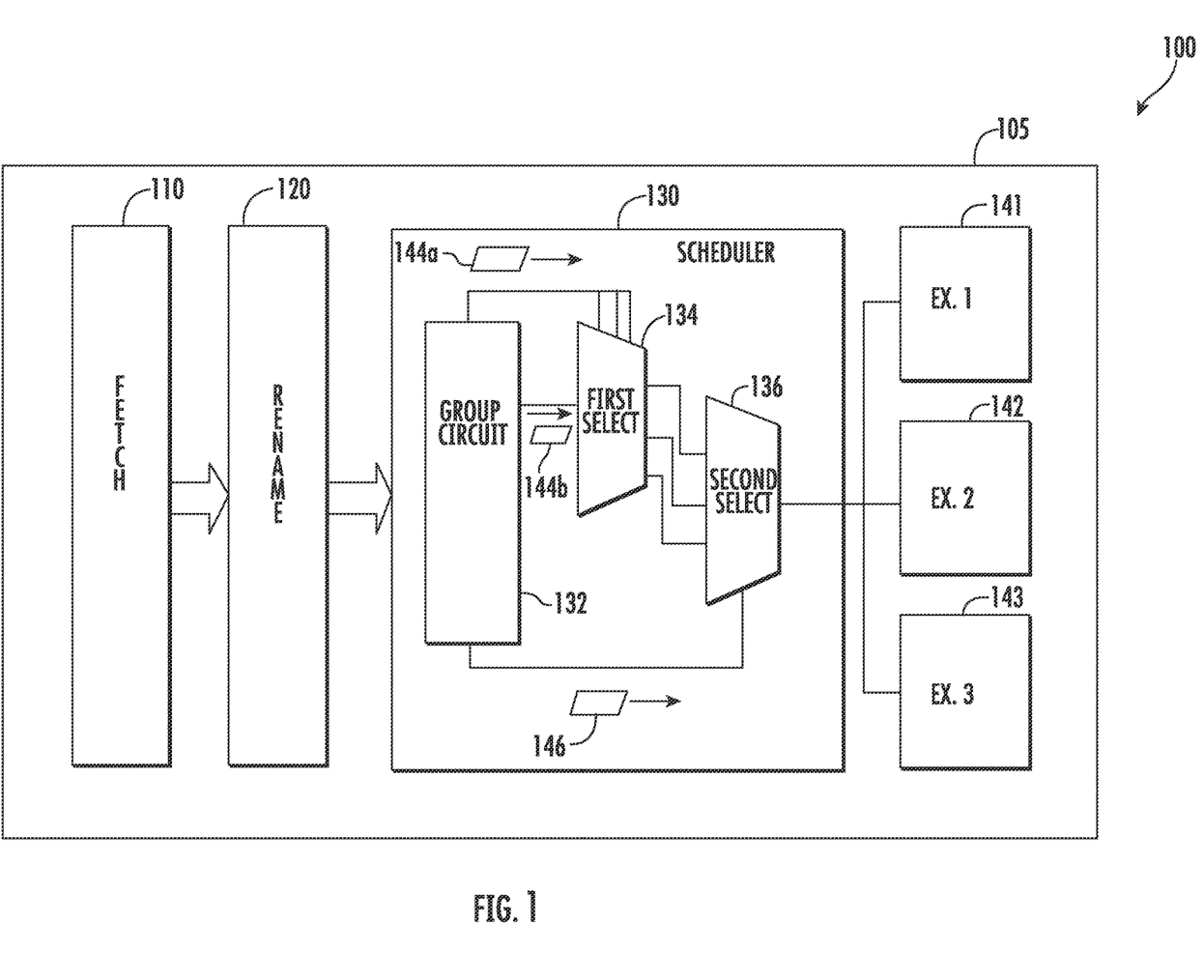
FIG. 1 is a block diagram of an exemplary processor configured to perform multi-level instruction scheduling.

In this regard, FIG. 1 is a block diagram of a system 100 including a processor 105 configured to perform multi-level instruction scheduling as will be discussed in greater detail herein. The processor 105 includes a fetch circuit 110 coupled to a rename circuit 120. The fetch circuit 110 may fetch instructions from a memory subsystem (which may include multiple levels of cache, main memory, and other types of memory known to those having skill in the art), and perform renaming on the fetched instructions before the fetched instructions are sent to be scheduled. The rename circuit 120 is coupled to a scheduler circuit 130, which is configured to perform multi-level instruction scheduling on groups of instructions received from the rename circuit 120, as will be discussed in greater detail herein. The scheduler circuit 130 chooses instruction(s) from a plurality of scheduling groups of instructions, and provides the chosen instruction(s) to one or more execution pipelines, such as a first execution pipeline 141, a second execution pipeline 142, and a third execution pipeline 143.

The scheduler circuit 130 further comprises a scheduling group circuit 132, which is configured to receive and store instructions received from the rename circuit 120 as a plurality of scheduling groups, as will be further explained with reference to FIG. 2. The scheduling group circuit 132 is further configured to write instructions into each of the plurality of groups in a program order (i.e., the order in which the instructions were received from the rename circuit 120), and to associate information with each entry in each group regarding whether that entry is ready for execution (i.e., has resolved any associated hazards or dependencies). The scheduling group circuit 132 is further configured to track relative age information for each group of the plurality of scheduling groups.

The scheduling group circuit 132 is coupled to a first selection circuit 134 and a second selection circuit 136. The scheduling group circuit 132 is configured to provide first selection information 144a and first instruction information 144b to the first selection circuit 134, and to provide second selection information 146 to the second selection circuit 136. The first selection circuit 134 uses the first selection information to perform a selection of a first selected group of instructions from the first instruction information, and provides the first selected group of instructions to the second selection circuit 136. The second selection circuit 136 uses the second selection information to perform a selection of one or more second selected instruction(s), and provides the second selected instruction(s) to one or more of the first execution pipeline 141, the second execution pipeline 142, and the third execution pipeline 143.

In one aspect, the first selection circuit 134 may select a first in-order entry that is ready for execution in each group to form the first selected group of instructions (which may include not selecting an entry from a particular group if none of the entries from that group are ready). Because the scheduling entries within a group are written in-order, the first selection circuit 134 need not perform an age comparison between intra-group entries, since their order in the group implicitly defines their relative age. The second selection circuit 136 receives the first selected group of instructions and the second selection information 146, which may include relative age information for each group of the plurality of scheduling groups, and selects the first ready in-order instruction from the oldest group of instructions, and provides that instruction to one of the execution pipelines 141-143. In one aspect, the relative age information may be maintained with an age matrix, as will be further discussed with reference to FIGS. 2 and 3b. Arranging the first selection circuit 134 and the second selection circuit 136 in this order may permit a design to take advantage of the fact that the first selection circuit 134 is able to perform its selection relatively earlier in a particular clock cycle as compared to the second selection circuit 136, for which the second selection information may be available relatively later in a particular clock cycle than the first selection information.

Figure 2:
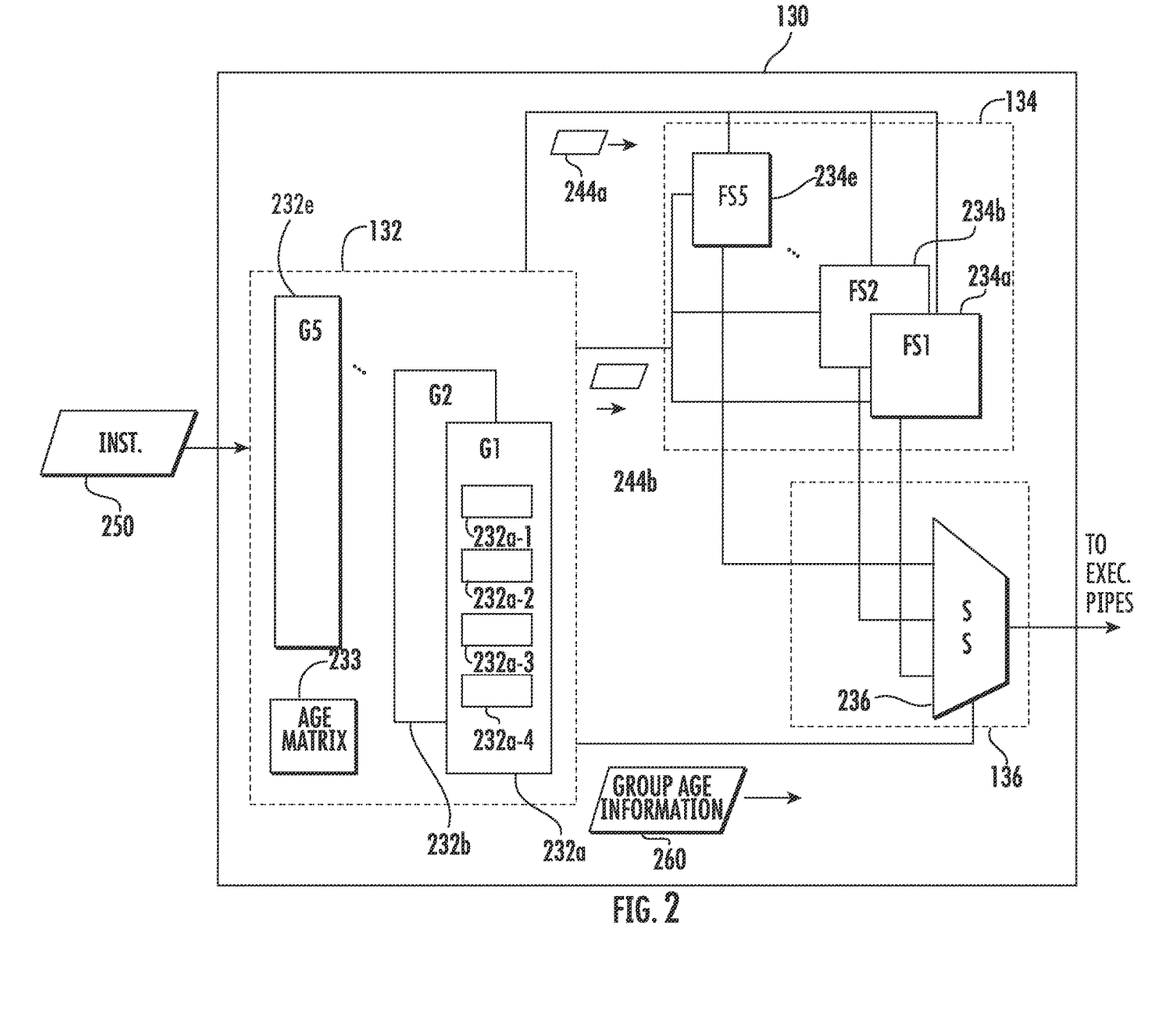
FIG. 2 is a detailed block diagram of the scheduler circuit of the exemplary processor of FIG. 1.

In this regard, FIG. 2 is a detailed block diagram of one aspect of the scheduler circuit 130 of FIG. 1. As described with respect to FIG. 1, the scheduler circuit 130 comprises a scheduling group circuit 132 coupled to a first selection circuit 134 and a second selection circuit 136. The scheduler circuit 130 may receive one or more instruction(s) 250, for example, from an earlier pipeline stage such as the rename circuit 120, and may place those instruction(s) 250 into one of a plurality of scheduling groups 232a-232e of the scheduling group circuit 132. Each of the scheduling groups 232a-232e comprises a plurality of scheduling entries 232a-1 to 232a-4, 232b-1 to 232b-4 through 232e-1 to 232e-4. As will be discussed later with respect to FIG. 3a, when instruction(s) 250 are received by the scheduling group circuit 132, those instruction(s) 250 are written in order into the first scheduling group 232a-232e that is available (i.e., has scheduled all of its previous scheduling entries, and has been indicated as available to be filled with new instructions). If the instruction(s) 250 comprise multiple instructions, those instructions may all be written in order into a single group, or may be written in order across multiple groups if not all of the received instruction(s) 250 can fit in a single group. Writing the instruction(s) 250 in order, whether in a single group or across multiple groups, allows the first selection circuit 134 to efficiently determine an oldest ready entry in each group by identifying the first ready entry in the order in which they were written. Similarly, determining whether at least one entry in each group is ready may be performed by, in one aspect, a logical OR of a ready indicator associated with each entry of the group. As those having skill in the art will appreciate, writing the instructions in order into a single group until that group has had all its scheduling entries filled also guarantees that all the instructions in each group will be either all older or all newer than all the instructions in each other group.

The scheduling group circuit 132 provides information regarding the order of the scheduling entries of each of the groups 232a-c as selection information 244a and the scheduling entries of each of the groups 232a-c as instruction information 244b to the first selection circuit 134. The scheduling group circuit 132 comprises a plurality of intra-group selection circuits 234a-e which is associated with an analogous scheduling group 232a-232e, each of which intra-group selection circuits 234a-e performs a selection of a first in-order entry of its associated group that is ready to be scheduled. As discussed above, because the scheduling entries are written to each group in-order, this selection may be performed relatively quickly, and the output of the first selection circuit 134 (i.e., the selections made by each of the intra-group selection circuits 234a-e) may be provided to the second selection circuit 136. The scheduling group circuit 132 further may maintain an age matrix 233 and may use the age matrix 233 to provide group age information 260 to the second selection circuit 136. The second selection circuit 136 uses the group age information 260 to select between the plurality of scheduling entries selection by the first selection circuit 134 by choosing the ready entry (i.e., one of the selections made by the intra-group selection circuits 234a-e) from the oldest group for scheduling at a second selection multiplexor 236. The second selection circuit 136 may then provide the ready entry from the oldest group to one or more execution pipelines.

Those having skill in the art will appreciate that by performing a first and second selection in this manner by the first selection circuit 134 and the second selection circuit 136 may allow instructions to be scheduled for execution out of program order. Since there is neither a guarantee nor a requirement that each of the groups 232a-e have at least one ready instruction at all times, nor that the oldest instruction in each of the groups is ready first, it is possible for a relatively older group of instructions to have its scheduling entries remain unscheduled while one or more newer groups of instructions has its scheduling entries scheduled for execution, if the older group of instructions has no ready scheduling entries while the one or more newer groups has ready scheduling entries. Likewise, it is also possible for the oldest entry in a single group to be scheduled for execution after one or more newer scheduling entries in that group, if the newer scheduling entries become ready for scheduling before the older entry.

Figure 3A:
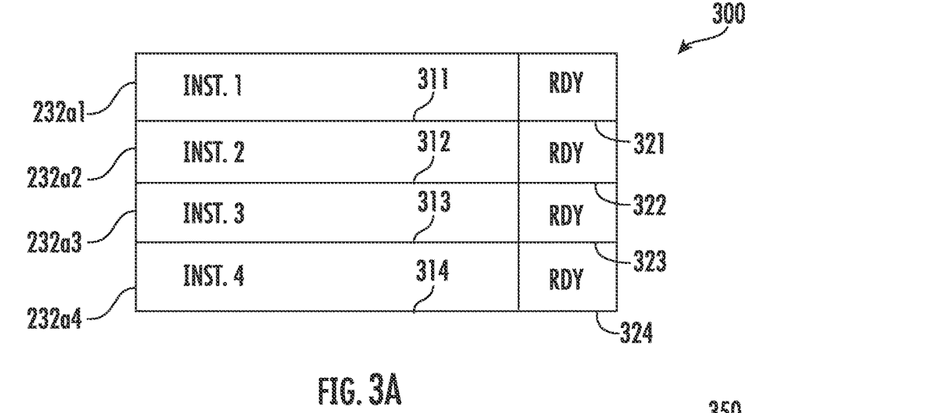
FIG. 3a is a detailed block diagram of an exemplary scheduling group of the scheduler circuit of FIG. 2.

FIG. 3a is a detailed block diagram 300 of a scheduling group, such as scheduling group 232a of FIG. 2. Scheduling group 232a has four scheduling entries 232a-1-4, each of which has an instruction portion 311-314 and a ready indicator 321-324. When scheduling entries are written into the scheduling group 232a, they may be written in order into scheduling entries 232a-1, 232a-2, 232a-3, and then 232a-4, and the analogous intra-group selection circuit 234a may examine the scheduling entries in that order to determine a first entry for which its ready indicator indicates that the entry is ready for scheduling. For example, if scheduling entries 232a-1 and 232a-4 are indicated as not ready by their ready indicators 321 and 324, while scheduling entries 232a-2 and 232a-3 are indicated as ready by their ready indicators 322 and 323, the intra-group selection circuit 234a will select the instruction in instruction portion 312 of entry 232a-2 to be provided to the second selection circuit 136.

Figure 3B:
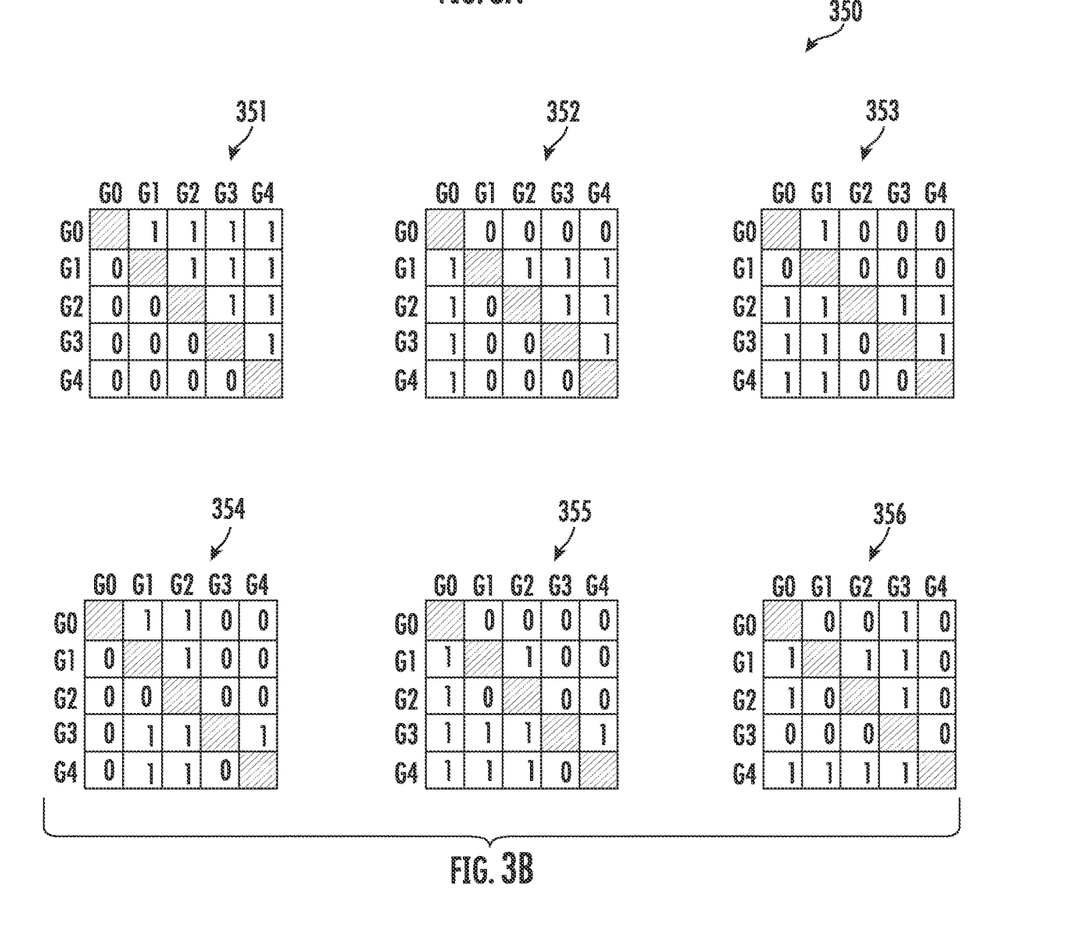
FIG. 3b is a conceptual diagram of an exemplary age matrix tracking the age of the scheduling groups of the scheduler circuit of FIG. 2.

FIG. 3b is a detailed block diagram 350 of an age matrix such as the age matrix 233 of FIG. 2, showing how the scheduling entries of the age matrix 233 are updated as groups G0-G4 (which may correspond to scheduling groups 232a-232e of FIG. 2) are filled with scheduling entries, selected for scheduling, and deallocated. In block 351, no groups have yet been filled with scheduling entries, and so the age matrix 233 is in an initial or reset state. In block 352, all the scheduling entries of group G0 has been filled with new instructions. To reflect this, the row corresponding to G0 is set to all "0" values to indicate that G0 is newer than all of the other groups, and the column corresponding to G0 is set to all "1" values to indicate that G0 is not older than any of the other groups. In block 353, group G1 has been filled with new instructions. To reflect this, the row corresponding to G1 is set to all "0" values to indicate that G1 is now newer than all of the other groups, and the column corresponding to G1 is set to all "1" values to indicate that G1 is now not older than any of the other groups. Because the column associated with G1 in the row associated with G0 has now been changed to a "1," the age matrix 233 now indicates that G0 is older than G1 (likewise, the column associated with G0 in the row associated with G1 has now changed to a "0," indicating that G1 is not older than G0). Similarly, in block 354, group G2 has now been filled with new instructions, so the row associated with G2 has been set to "0" values, and the column associated with G2 has been set to "1" values. Examining the row associated with G0 now indicates that G0 is older than G1 and G2 (since their columns are set to "1" values in that row), and examining the row associated with G1 indicates that G1 is older than G2 (since that column is set to a "1" value in that row). In block 355, group G0 has once again been filled with new instructions (e.g., after all of the instructions written into it in block 352 have been scheduled, and so the group G0 has become available to be re-filled). Once again, the row corresponding to G0 has been set to "0" values, and the column associated with G0 has been set to "1" values. Examining the row associated with G1 now indicates that G1 is older than G0 and G2 (since their columns are set to "1" values in that row), and examining the row associated with G2 indicates that G2 is older that G0 (since that column is set to a "1" value in that row). Finally, in block 356, group G3 has been filled with new instructions, and so the row corresponding to G3 has been set to "0" values, and the column associated with G3 has been set to "1" values. Examining the rows G0, G1, G2, and G3 shows that the relative age of the groups is (in order of oldest to youngest) G4 (which has not yet been written, and is in its initial state), G1, G2, G0, and G3. This relative age information as between the scheduling groups 232a-e may be sent to the second selection circuit 136, which may use that information in selecting the oldest group which has at least one ready entry to be scheduled.

Figure 4:
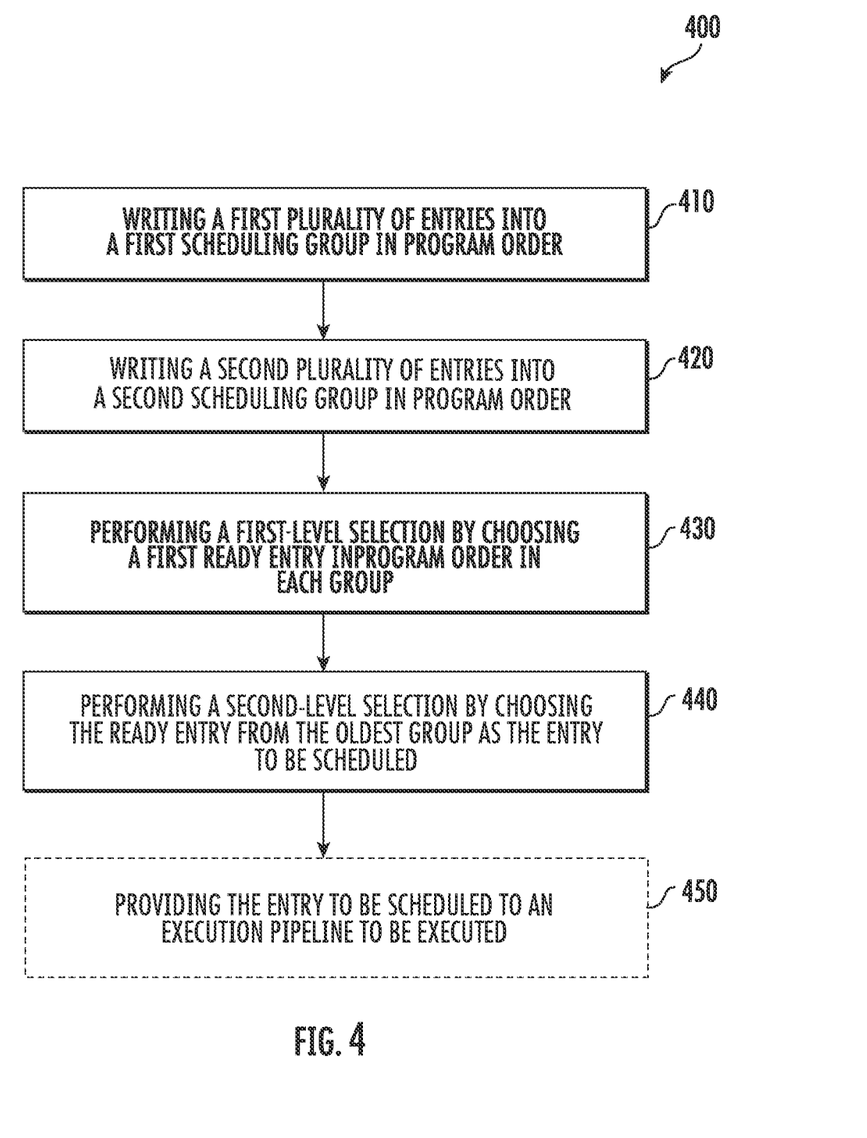
FIG. 4 is a flowchart illustrating a method of performing multi-level instruction scheduling.

FIG. 4 is a block diagram of a method of performing multi-level instruction scheduling 400, which may be performed as discussed with respect to FIGS. 1, 2, 3a, and 3b. The method begins at block 410, by writing a first plurality of scheduling entries into a first scheduling group in program order. For example, this may correspond to writing the scheduling entries of scheduling group 232a (G0 in FIG. 3b). The method continues at block 420, by writing a second plurality of scheduling entries into a second scheduling group in program order. For example, this may correspond to writing the scheduling entries of scheduling group 232b (G1 in FIG. 3b). The method continues at block 430, by performing a first-level selection by choosing a first ready entry in program order in each group. This may be performed by the first selection circuit 134, as described with respect to FIGS. 1 and 2, and may involve examining a ready indicator for each entry in each group of scheduling entries, such as the ready indicators 321-324 of FIG. 3a. The method then continues at block 440, by performing a second-level selection by choosing the ready entry from the oldest group as the entry to be scheduled. For example, with reference to block 353 of FIG. 3b, this may involve selecting group G0 instead of group G1, assuming that group G0 has at least one ready entry. The method then continues at block 450, by providing the entry to be scheduled to an execution pipeline to be executed. As discussed with reference to FIGS. 1 and 2, this may include sending the selected entry to execution on one or more execution pipelines.

Those having skill in the art will recognize that the aspects discussed above with respect to FIGS. 1-4 are for the purposes of illustration and not by way of limitation, and that other aspects are within the scope of the teachings of the present disclosure. For example, the number of groups and the number of scheduling entries per group will be recognized as a matter of design choice based on a particular implementation, and the teachings of the present disclosure can apply regardless of the number of groups and scheduling entries per group chosen. Similarly, although the illustrated aspect shows two levels of selection, more levels of selection may be used in other aspects (for example, another aspect might perform an intra sub-group selection, then intra-group selection, and then inter-group selection), and such aspects are also within the scope of the teachings of the present disclosure.

Further, although the previous aspects have discussed selecting a single ready entry at a time for scheduling, those having skill in the art will recognize that the teachings of the present disclosure are not so limited, and that multiple ready scheduling entries may be identified and scheduled in a system that permits parallel scheduling. For example, in another aspect, the scheduler may identify up to two scheduling entries that are ready and may schedule them in parallel on different execution pipelines. The scheduling entries may either be from the same group, and may be the two oldest ready entries in that group, or may be the respective oldest entry in two different groups, if the oldest group has only a single ready entry. As such, the number of ready scheduling entries which may be identified and scheduled in parallel is a matter of design choice, and those having skill in the art will recognize that this choice is influenced by such factors as the available size and desired complexity of the scheduler logic, the number and type of execution pipelines, and similar considerations.

The exemplary processor that can perform multi-level instruction scheduling according to aspects disclosed herein and discussed with reference to FIGS. 1-4 may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
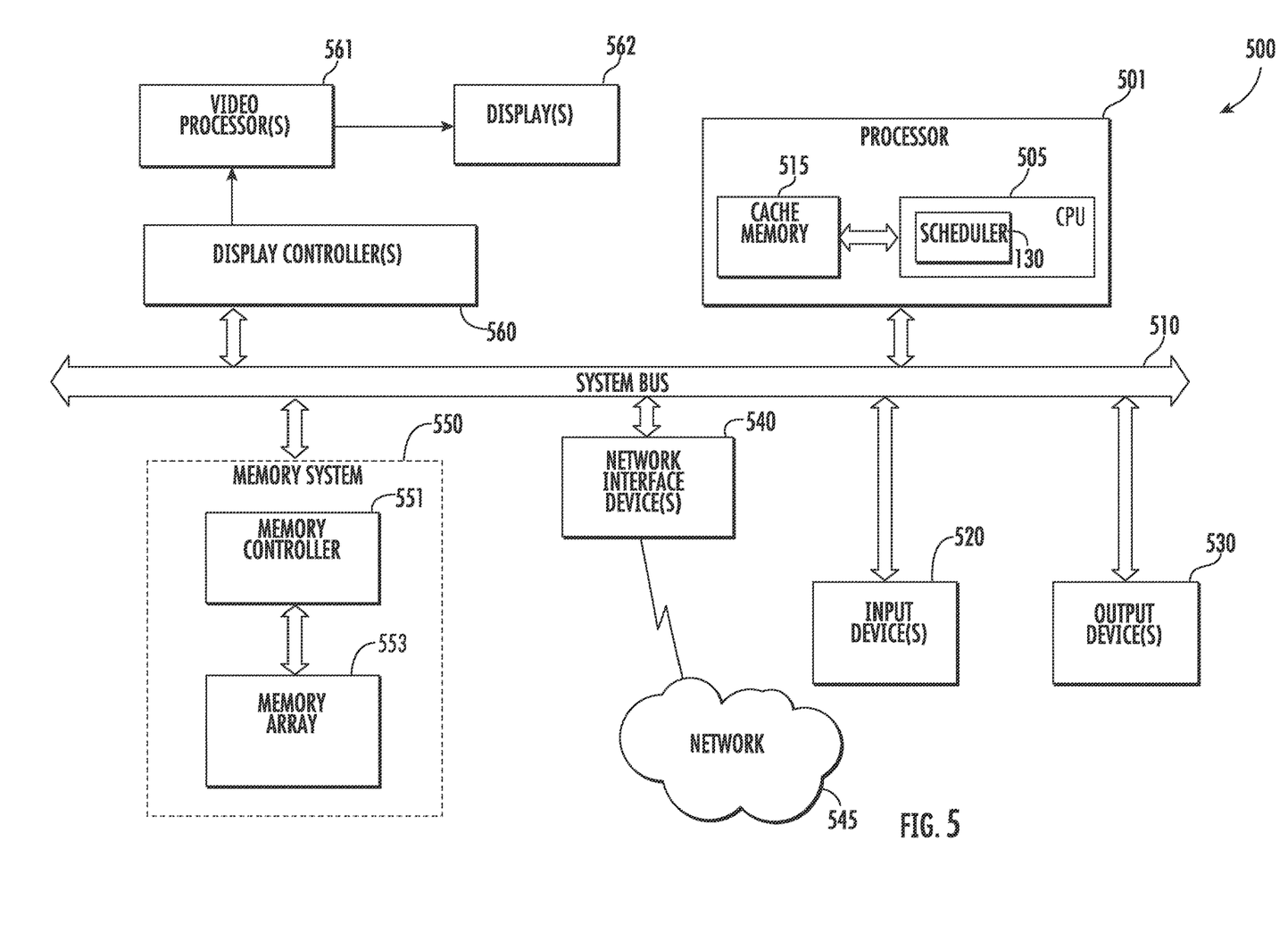
FIG. 5 is a block diagram of an exemplary processor-based system including a processor configured to perform multi-level instruction scheduling.

In this regard, FIG. 5 illustrates an example of a processor-based system 500 that can perform multi-level instruction scheduling as illustrated and described with respect to FIGS. 1-4. In this example, the processor-based system 500 includes a processor 501 having one or more central processing units (CPUs) 505, each including one or more processor cores, and which may correspond to the processor 105 of FIG. 1, and as such may include the scheduler circuit 130, which may be configured to perform multi-level instruction scheduling as illustrated and described with respect to FIGS. 1-4. The CPU(s) 505 may be a master device. The CPU(s) 505 is coupled to a system bus 510 and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. The memory controller 551 interfaces with a memory array 553 that contains memory bit cells. The memory controller 551 interfaces to the memory array to write and read data to and from the memory array 553. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550, one or more input devices 520, one or more output devices 530, one or more network interface devices 540, and one or more display controllers 560, as examples. The input device(s) 520 can include any type of input device, including, but not limited to, input keys, switches, voice processors, etc. The output device(s) 530 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory units 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An apparatus, comprising:
   a scheduler circuit comprising a scheduling group circuit, a first selection circuit, and a second selection circuit;
   the scheduling group circuit comprising a plurality of groups of scheduling entries, each scheduling entry among the groups of scheduling entries each comprising an instruction portion and a ready portion, each group configured to have its scheduling entries written in-order;
   the scheduling group circuit further configured to maintain group age information associated with each group of the plurality of groups;
   the first selection circuit configured to select a first in-order ready entry from each group;
   the second selection circuit configured to select the first in-order ready entry belonging to the oldest group based on the group age information for scheduling; and
   the scheduler circuit further configured to receive new instructions and to write one or more new instruction(s) in order into a group of scheduling entries which has been indicated as available by being configured to:
      write a first new instruction in-order into a first group of scheduling entries which has been indicated as available; and
      write a second new instruction in-order into a second group of scheduling entries which has been indicated as available when the first group of scheduling entries which was indicated as available has been filled.

2. The apparatus of claim 1, wherein the first selection circuit is configured to not select an entry from a group where no scheduling entries are ready.

3. The apparatus of claim 1 further configured to maintain the group age information in an age matrix configured to track the age of each group of scheduling entries with respect to all of the other groups of scheduling entries.

4. The apparatus of claim 3, wherein the age matrix is further configured to be updated when all the scheduling entries of a scheduling group have been filled with new instructions.

5. The apparatus of claim 1, wherein the scheduler circuit is configured to provide the first in-order ready entry belonging to the oldest group selected by the second selection circuit to an execution pipeline.

6. The apparatus of claim 1, integrated into an integrated circuit (IC).

7. The apparatus of claim 6, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

8. An apparatus, comprising:
means for scheduling comprising means for storing scheduling groups, means for performing a first selection, and means for performing a second selection;
the means for storing scheduling groups comprising a plurality of groups of scheduling entries, each scheduling entry among the groups of scheduling entries each comprising an instruction portion and a ready portion, each group configured to have its scheduling entries written in-order;
the means for performing a first selection comprises a means for selecting a first in-order ready entry from each group;
the means for performing a second selection comprises a means for selecting the first in-order ready entry belonging to the oldest group based on the group age information for scheduling; and
the means for scheduling further comprising means for receiving new instructions and means for writing one or more new instructions in order into a group of scheduling entries which has been indicated as available, wherein the means for writing the one or more new instructions comprises:
means for writing a first new instruction in-order into a first group of scheduling entries which has been indicated as available; and
means for writing a second new instruction in-order into a second group of scheduling entries which has been indicated as available when the first group of scheduling entries which was indicated as available has been filled.

9. A method, comprising:
writing a first plurality of scheduling entries into a first scheduling group in order;
writing a second plurality of scheduling entries into a second scheduling group in order;
performing a first selection by choosing a first ready entry in order in each scheduling group;
performing a second selection by choosing the ready entry from the oldest group as the entry to be scheduled;
receiving new instructions; and
writing one or more new instructions in order into a group of scheduling entries which has been indicated as available by:
writing a first new instruction in-order into a first group of scheduling entries which has been indicated as available; and
writing a second new instruction in-order into a second group of scheduling entries which has been indicated as available when the first group of scheduling entries which was indicated as available has been filled.

10. The method of claim 9, wherein all of the scheduling entries of the first plurality of scheduling entries are older than all of the entries of the second plurality of scheduling entries.

11. The method of claim 9, wherein the first ready entry in order in at least one scheduling group is not the oldest entry in the scheduling group.

12. The method of claim 9, wherein performing the first selection further includes not selecting an entry from a group which has no ready scheduling entries.

13. The method of claim 12, wherein the group which has no ready scheduling entries is older than at least one group which has at least one ready entry.

14. The method of claim 9, further comprising:
updating an age matrix based on writing the first plurality of scheduling entries into the first scheduling group to indicate that the first scheduling group is a newest scheduling group; and
updating the age matrix based on writing the second plurality of scheduling entries into the second scheduling group to indicate that the second scheduling group is the newest scheduling group.

15. The method of claim 9, further comprising providing the entry to be scheduled to an execution pipeline to be executed.

16. A non-transitory computer-readable medium having stored thereon computer executable instructions which, when executed by a processor, cause the processor to:
write a first plurality of scheduling entries into a first scheduling group in order;
write a second plurality of scheduling entries into a second scheduling group in order;
perform a first selection by choosing a first ready entry in order in each scheduling group;
perform a second selection by choosing the ready entry from the oldest group as the entry to be scheduled;
receive new instructions; and
write one or more new instructions in order into a group of scheduling entries which has been indicated as available by causing the processor to:
write a first new instruction in-order into a first group of scheduling entries which has been indicated as available; and
write a second new instruction in-order into a second group of scheduling entries which has been indicated as available when the first group of scheduling entries which was indicated as available has been filled.

17. The non-transitory computer-readable medium of claim 16, wherein the instructions further cause the processor to:
update an age matrix based on writing the first plurality of scheduling entries into the first scheduling group to indicate that the first scheduling group is a newest scheduling group; and
update the age matrix based on writing the second plurality of scheduling entries into the second scheduling group to indicate that the second scheduling group is the newest scheduling group.

* * * * *